(12) United States Patent
Mahe et al.

(10) Patent No.: US 10,383,407 B2
(45) Date of Patent: Aug. 20, 2019

(54) RETAINING DEVICE HAVING HOOKS

(71) Applicant: APLIX, Le Cellier (FR)

(72) Inventors: Anthony Mahe, Thouare sur Loire (FR); Damien Pierre Antoine Bosser, Nantes (FR)

(73) Assignee: APLIX, Le Cellier (FR)

( * ) Notice: Subject to any disclaimer, the term of this patent is extended or adjusted under 35 U.S.C. 154(b) by 332 days.

(21) Appl. No.: 14/914,320

(22) PCT Filed: Sep. 1, 2014

(86) PCT No.: PCT/FR2014/052156
§ 371 (c)(1),
(2) Date: Feb. 25, 2016

(87) PCT Pub. No.: WO2015/033048
PCT Pub. Date: Mar. 12, 2015

(65) Prior Publication Data
US 2016/0198811 A1    Jul. 14, 2016

(30) Foreign Application Priority Data
Sep. 3, 2013  (FR) .................................... 13 58426

(51) Int. Cl.
*A44B 18/00* (2006.01)
*A47C 31/02* (2006.01)
(Continued)

(52) U.S. Cl.
CPC ...... *A44B 18/0049* (2013.01); *A44B 18/0061* (2013.01); *A44B 18/0073* (2013.01);
(Continued)

(58) Field of Classification Search
CPC ............ A44B 18/0073; A44B 18/0096; B29C 44/1271; B29C 45/44
See application file for complete search history.

(56) References Cited

U.S. PATENT DOCUMENTS 4,710,414 A * 12/1987 Northrup ............ B29C 44/1271
24/306
5,005,242 A    4/1991 Kennedy et al.
(Continued)

FOREIGN PATENT DOCUMENTS

DE    20 2005 013 339 U1    12/2005
DE    10 2010 036 798 A1    2/2012
(Continued)

OTHER PUBLICATIONS

English Translation of Search Report dated Nov. 21, 2014, in corresponding International PCT Application No. PCT/FR2014/052156, filed on Sep. 1, 2014 (3 pages).

*Primary Examiner* — Jason W San
(74) *Attorney, Agent, or Firm* — Bookoff McAndrews, PLLC

(57)    ABSTRACT

A hooked retaining device (100) for defining at least a portion of a reception groove formed at the periphery of an article comprises a retaining element (10) made by injection molding. The retaining element has a first side wall (11) and a second side wall (12) that are spaced apart from each other in a lateral direction, and a base (20) connecting together said side walls (11, 12). The side walls (11, 12) and the base (20) define a retaining groove (14) that is open in a main direction (z) in order to receive a counterpart having hooks or loops. According to the invention, at least one of the side walls (11, 12) presents a plurality of hooks (30) adapted to co-operate with the counterpart, each hook (30) having at least one hooking portion oriented towards the base (20) of the retaining element (10).

20 Claims, 7 Drawing Sheets

(51) Int. Cl.
  *B29C 45/44* (2006.01)
  *B29C 44/12* (2006.01)
  *B60N 2/58* (2006.01)

(52) U.S. Cl.
  CPC ...... *A44B 18/0076* (2013.01); *A44B 18/0084* (2013.01); *A47C 31/023* (2013.01); *B29C 44/1271* (2013.01); *B29C 45/44* (2013.01); *B60N 2/5825* (2013.01); *B60N 2/5841* (2013.01)

(56) References Cited

U.S. PATENT DOCUMENTS

| | | | | |
|---|---|---|---|---|
| 6,163,939 | A * | 12/2000 | Lacey | A44B 18/0049 24/450 |
| 6,224,364 | B1 * | 5/2001 | Harvey | B29C 45/1615 264/328.7 |
| 7,077,473 | B2 * | 7/2006 | Demain | B29C 33/12 297/218.2 |
| 7,141,283 | B2 * | 11/2006 | Janzen | A44B 18/0049 428/36.9 |
| 7,998,548 | B2 * | 8/2011 | Murasaki | A44B 18/0076 24/442 |
| 9,167,901 | B2 * | 10/2015 | Suenaga | A47C 7/24 |
| 9,278,469 | B2 * | 3/2016 | Mahe | A44B 18/0061 |
| 9,694,731 | B2 * | 7/2017 | Hipshier | B29C 44/0407 |
| 9,826,801 | B2 * | 11/2017 | Mascarenhas | A44B 18/0076 |
| 2002/0031637 | A1 * | 3/2002 | Oborny | B29C 44/1271 428/99 |
| 2003/0162008 | A1 | 8/2003 | Cappucci et al. | |
| 2004/0062904 | A1 * | 4/2004 | Rice | B29C 44/1271 428/95 |
| 2007/0022580 | A1 * | 2/2007 | Ducauchuis | A44B 18/0053 24/452 |
| 2012/0291237 | A1 * | 11/2012 | Billarant | B29C 44/1261 24/451 |
| 2013/0276333 | A1 * | 10/2013 | Wawrousek | A43B 1/0009 36/102 |
| 2015/0202808 | A1 * | 7/2015 | Cheng | A44B 18/0076 264/46.4 |
| 2016/0366991 | A1 * | 12/2016 | Mascarenhas | A44B 18/0076 |

FOREIGN PATENT DOCUMENTS

| | | |
|---|---|---|
| EP | 1 358 826 A1 | 11/2003 |
| WO | WO 2011/058415 A1 | 5/2011 |
| WO | WO 2011/089334 A1 | 7/2011 |

* cited by examiner

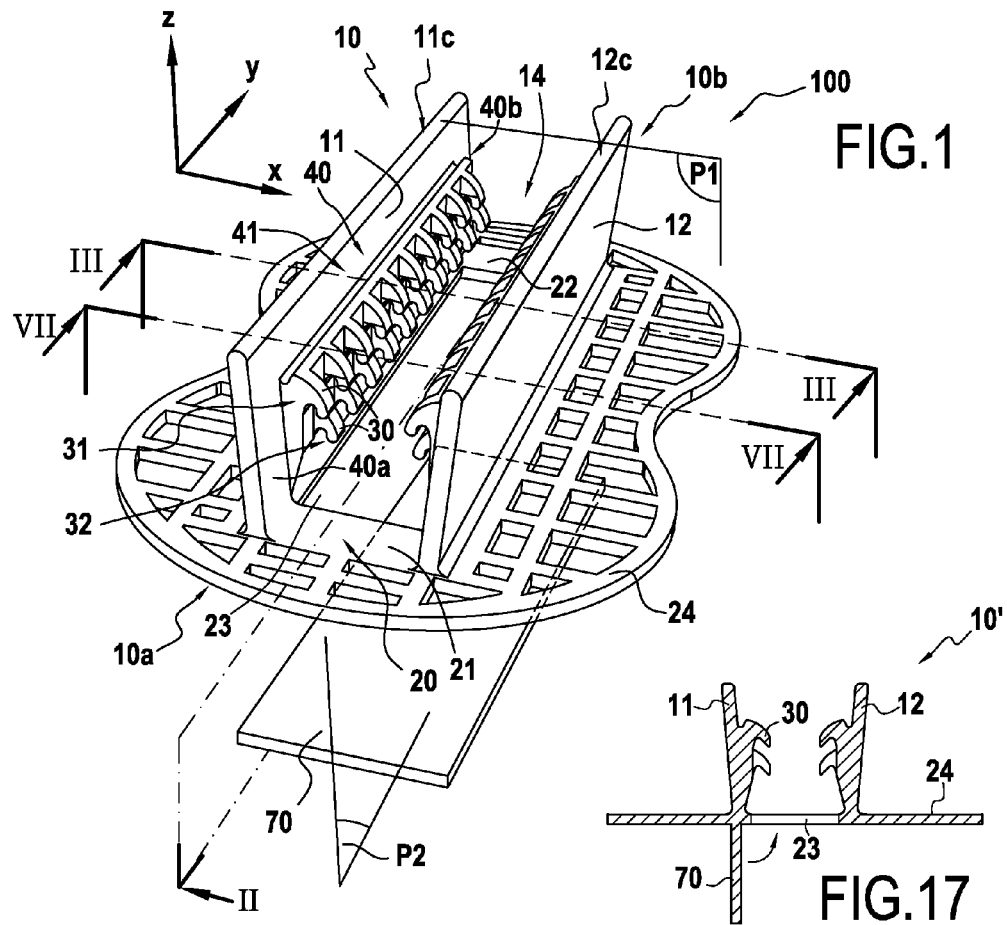
FIG.1
FIG.17
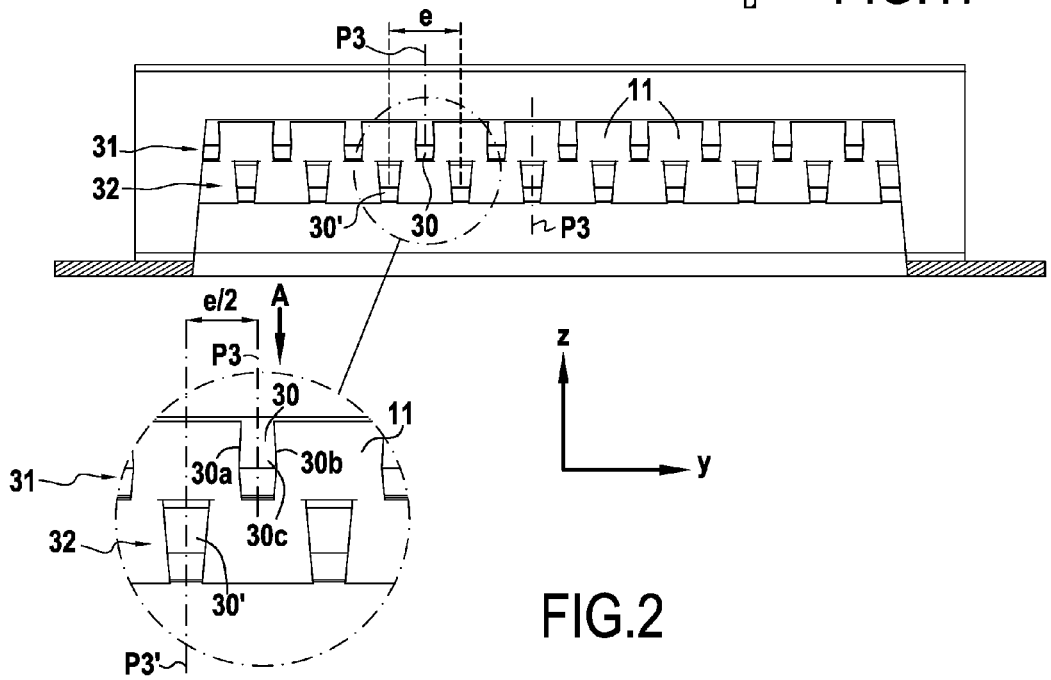
FIG.2

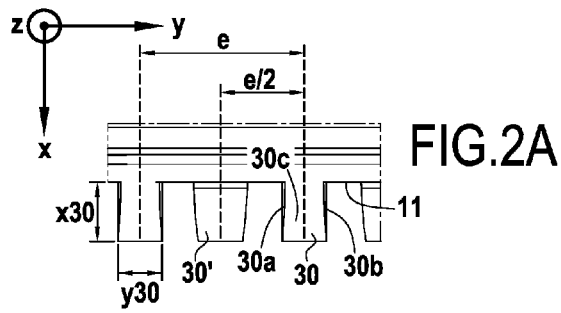
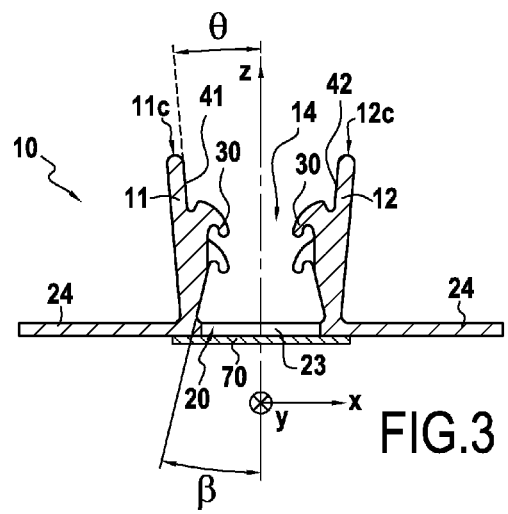
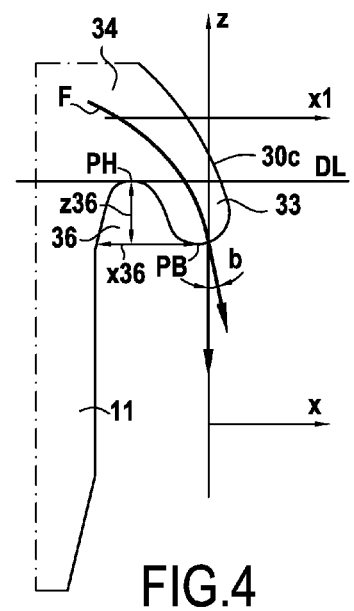
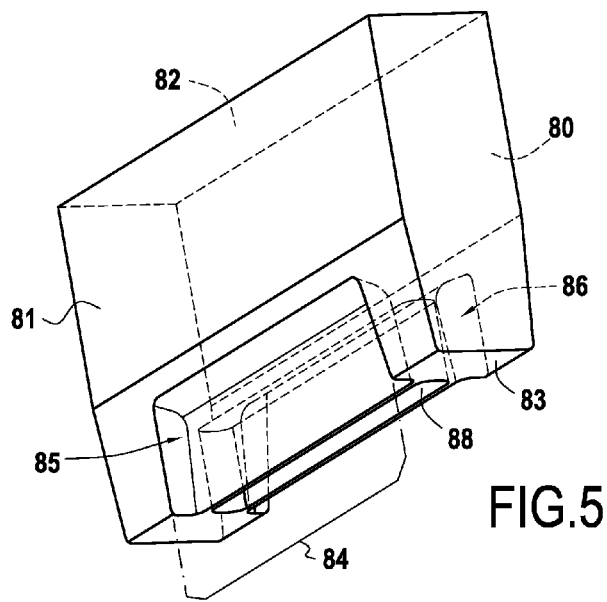

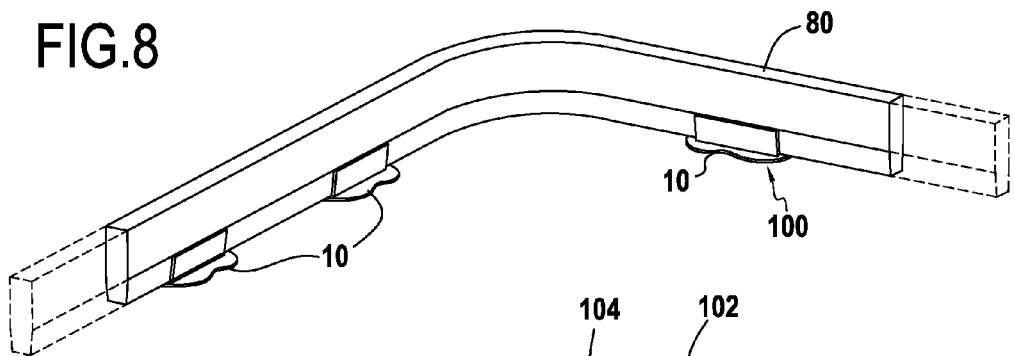
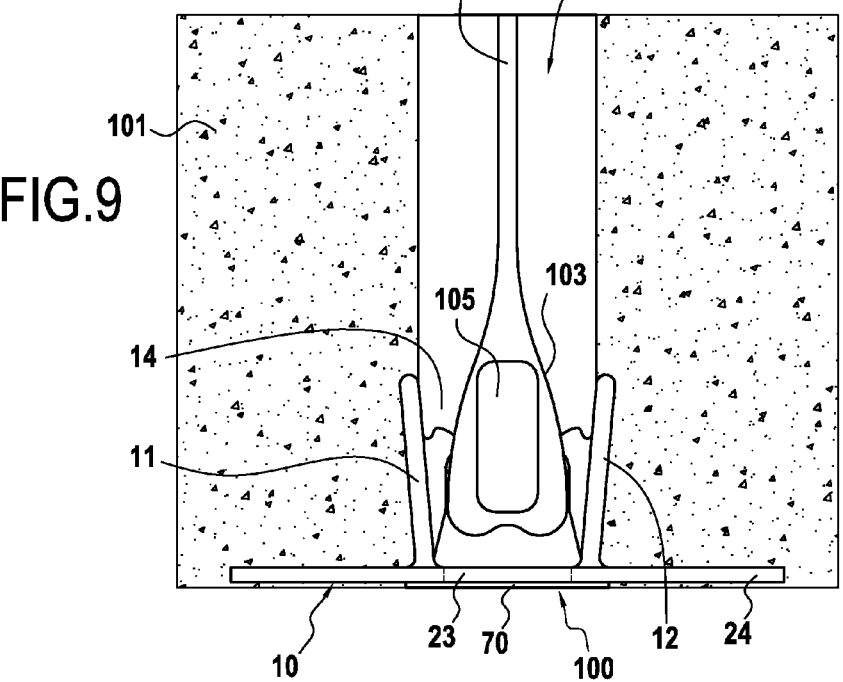
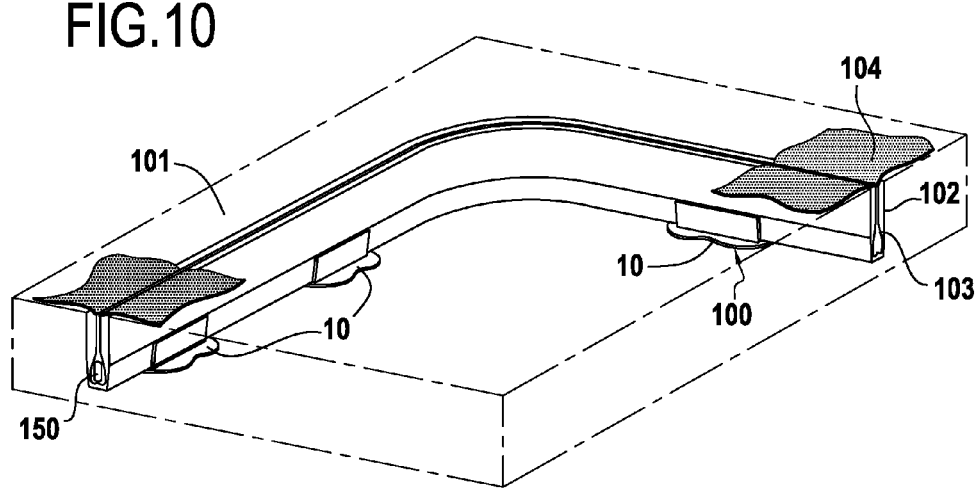

RETAINING DEVICE HAVING HOOKS

CROSS-REFERENCE TO RELATED APPLICATIONS

This application is the U.S. national phase entry under 35 U.S.C. § 371 of International PCT Application No. PCT/FR2014/052156, filed on Sep. 1, 2014, which claims priority to French Patent Application No. FR 1358426, filed on Sep. 3, 2013, the entireties of each of which are incorporated by reference herein.

TECHNICAL FIELD

The present description relates to a hooked retaining device, i.e. a device having hooks, that is suitable for being fastened to an article in order to fasten a cover on the article by means of the hooks of the retaining device co-operating with a counterpart having hooks or loops and that is secured to the cover.

The retaining device of the present invention is particularly suitable for fastening a cover of the slipcover type on an article, in particular a molded article, such as a motor vehicle seat pad.

BACKGROUND OF THE INVENTION

A motor vehicle seat is constituted by a molded pad, generally made of foam, covered by a cover, e.g. made of fabric or of leather. At present, in order to fasten a cover fabric on the outside surface of a motor vehicle seat pad, one or more retaining elements are placed in one or more reception grooves formed at the periphery of the pad, which retaining elements are suitable for co-operating with the covering by clip-fastening systems, by abutment systems, or indeed, more recently, by self-gripping systems where hooks engage hooks or hooks engage loops. These retaining elements are usually overmolded by the vehicle seat pad, at its periphery, at the time the pad is itself molded.

Patent application US 2003/0162008 describes such a retaining element that is generally U-shaped, having two side walls defining an inside space that is to receive a wire secured to a cover fabric for the vehicle seat. At its distal end, each side wall carries a projection that is to co-operate by abutment or clip-fastening with the wire so as to hold the cover around the vehicle seat pad.

The fastening of the wire by means of abutment or clip-fastening as obtained with that system is not sufficiently reliable. Furthermore, it is very difficult, if not impossible, to undo the fastening without damaging the cover.

The patent application published under the number WO 2011/089334 describes a retaining element of another kind comprising two side walls and a bottom defining a U-shaped groove, with hooks projecting from the bottom of the retaining element, which hooks are adapted to co-operate with loops or hooks of the cover.

During tests, it has been found that the self-gripping fastening obtained between the cover fabric and the hooks situated in the bottom of the retaining element is not entirely satisfactory, with the cover easily becoming detached from the retaining element when a traction force is applied thereto.

OBJECT AND SUMMARY OF THE INVENTION

One of the objects of the present invention is to provide a retaining device making it possible to remedy the above-mentioned drawbacks of the prior art, and in particular that makes it possible to provide fastening that is reliable, capable of withstanding traction, and that can be undone, should that be necessary, without damaging the cover.

This object is achieved with a hooked retaining device for defining at least a portion of a reception groove formed at the periphery of an article, in particular a molded article, the retaining device comprising a retaining element made by injection molding, the retaining element having a first side wall and a second side wall that are spaced apart from each other in a lateral direction, and a base connecting together said side walls, said side walls and the base defining a retaining groove that is open in a main direction in order to receive a counterpart having hooks or loops, said retaining device being characterized in that at least one of the side walls presents a plurality of hooks adapted to co-operate with the counterpart, each hook having at least one hooking portion (i.e. hooking head and/or protuberance, . . . ) oriented towards the base of the retaining element.

In the present description, and unless specified to the contrary, the main direction of the retaining device is defined as the direction along which the counterpart is inserted into the retaining groove. When the retaining element presents a plane of symmetry, the first and second side walls extend respectively on either side of said plane of symmetry, with the main direction extending in said plane of symmetry. When the retaining element has a plane base or if a plane bottom element is fitted to the retaining element, as suggested below, then the main direction is substantially orthogonal to said base or to said bottom element.

Unless specified to the contrary, the lateral direction of the retaining device is defined as the direction perpendicular to the above-specified main direction and that is also substantially orthogonal to the side walls of the retaining element or to a midplane between those two walls.

Furthermore, in the present description, and unless specified to the contrary, a longitudinal direction of the retaining device is defined as the direction that is perpendicular to the above-specified main and lateral directions, and that is thus substantially parallel to the side walls of the retaining element. A plane normal to the longitudinal direction is a plane that is transverse relative to the retaining device.

On at least one of its side walls, the retaining element of the invention has a plurality of hooks for co-operating with the hooks and/or loops of a counterpart, thereby constituting a self-gripping fastening. The hooks project from the inside face of said side wall and their hooking portions are oriented towards the base.

With such an orientation, the hooks do not impede inserting the counterpart into the retaining groove, but they provide strong resistance to traction once they co-operate with the counterpart. When the counterpart is pulled away from the retaining groove in the main direction, the hooks work in shear and are very effective at preventing the counterpart from being extracted. With such a configuration, the force needed to disengage the counterpart has been measured as being at least twice the force that would be needed to obtain the same result if the hooks were arranged in the bottom of the retaining groove.

In an example, if a hook is projected onto a plane that is transverse relative to the retaining device, the salient angle as measured between a first vector that is tangential to the neutral axis of a hook at the distal end of the hook and that is oriented away from said hook, and a second vector that is parallel to the main direction of the retaining device and that is oriented towards the inlet facing towards the bottom of the retaining groove, is strictly less than 90°, and generally lies in the range 5° to 65°.

The term "neutral axis" is used herein to mean the line that, in the projection plane, is at all points situated at equal distances from the bottom and top surfaces of the hook, said distances being measured in a direction orthogonal to the tangent to said neutral axis.

In the invention, each hook of the retaining element, either on its own or together with the side wall from which it projects, defines at least one retention cavity (or reception cavity or retaining cavity) adapted to receive at least one hook or loop of the counterpart. The retention cavity is defined, at least in part, by the hooking portion of the hook facing towards the base of the retaining element.

It can be understood that a hook retention cavity is formed by a hollow portion, i.e. a portion without material, that extends in the main direction z of the retaining device and that opens out towards the base of the retaining element.

Typically, when the retaining device is in its utilization configuration, in other words when the retaining device is arranged to define at least a portion of a reception groove formed at the periphery of an article, and more particularly when it is arranged to co-operate with a counterpart having loops or hooks, the hooking portion of the hook is spaced apart from the side wall from which said hook projects or from some other face of said hook in the lateral direction of the retaining device by said hollow portion forming the retention cavity.

More generally, the retention cavity is a volume without any interposed material in a direction orthogonal to the main plane of the side wall between the hooking portion of the hook and said side wall or another face of the hook.

In a first particular embodiment, the retention cavity is formed by a concave portion, in particular a concave portion of the hook.

It can thus be understood that in use, a hook of the retaining element serves to retain a hook or a loop of the counterpart not only in the main direction, but also in the lateral direction of the retaining device because of the hooking portion of the hook, in particular by preventing the loop or the hook of the counterpart from disengaging by moving away from the side wall from which the hook extends. Typically, the retention cavity is wide enough to capture a hook or a loop of the counterpart, and deep enough to prevent the hook or the loop of the counterpart from becoming extracted from the retention cavity.

If a hook is projected onto a plane that is transverse relative to the retaining device in use, the width of the retention cavity of said hook is measured in the lateral direction of the retaining device between the low point of the hook (in other words the point of the hooking portion of the hook that is closest to the base in the main direction), and the nearest opposite portion of the retaining element. The opposite portion of the retaining element may either be the side wall from which the hook projects or it may be an opposite face of the hook itself.

In the same manner, in a projection plane that extends transversely relative to the retaining device in use, the depth of the retention cavity is defined as the distance measured in the main direction of the retaining device between the above-mentioned low point of the hook and the high point of the bottom face of the hook that faces towards the base (in other words the point of this face that is farthest from the base along the main direction and that is disposed between the side wall and the low point).

In an example, the width of the retention cavity of at least one hook, and preferably of each hook, lies in the range 0.1 millimeters (mm), to 3 mm, preferably in the range 0.2 mm to 2 mm, and more preferably in the range 0.3 mm to 1 mm.

In an example, the depth of the retention cavity of at least one hook, and preferably of each hook, lies in the range 0.1 mm to 3 mm, preferably in the range 0.2 mm to 2 mm, and more preferably in the range 0.3 mm to 1 mm.

The maximum width of a hook is measured in the longitudinal direction of the retaining device at the hooking portion of the hook in a projection plane of the hook that is orthogonal to the main direction z of the retaining device. When the hooks of the retaining element are to co-operate with the counterpart to form a self-gripping fastening of the hook/loop type, it can be understood that the maximum width is the width that the loops of the counterpart must be capable of passing in order to become inserted in the retention cavities of the hooks and be retained therein.

The maximum length of a hook is measured in the lateral direction of the retaining device, from the side wall from which the hook projects.

In an element, the maximum width of the hook is less than its maximum length. The maximum length of the hook is preferably not less than one-third of its maximum width. Still more preferably, the maximum length of the hook is greater than or equal to its maximum width.

The retaining element, which is made by injection molding, is formed as a single piece, e.g. of thermoplastic material. It thus generally includes, on its outside surface, at least one zone of recessed or projecting shape that corresponds to the point where the molding material was injected. Fabrication of the retaining element by molding is easy and inexpensive.

In an example, the base of the retaining element presents at least one opening between the first and second side walls. As explained below in the present description, this opening results from the particular method used for fabricating the retaining element. In general, the opening extends over a length (measured in the longitudinal direction) that is equal to or greater than the maximum length over which the hooks extend in the longitudinal direction.

In an example, the retaining device includes at least one bottom element suitable for being positioned between the first and second side walls in order to close the opening. The bottom element serves to provide sealing of the retaining groove, e.g. while molding the article that is overmolded on the retaining device, if the article is indeed molded. It generally has dimensions suitable for completely covering the opening in the base of the retaining element.

The bottom element may be an element that is distinct from the retaining element and fastened on said retaining element in order to close the opening.

In a variant, the bottom element may be made integrally with the retaining element and may constitute a portion that can be folded between a disengaged position in which the opening in the base is disengaged and a closed position in which it closes the opening.

In a provision of the invention, the retaining element and/or the bottom element may comprise magnetic material that may optionally be magnetized. For example, the retaining element and/or the bottom element may be made in full or in part out of a plastics material filled with metal particles.

The use of a magnetic material makes it possible, by co-operating with other magnetic elements, to hold the various elements of the retaining device in position while overmolding is taking place.

It should be observed that the bottom element may be made of a material that is different from or identical to that of the side walls of the retaining element.

In an example, the plurality of hooks defines at least two series of hooks that are spaced apart in the main direction, each hook of one series of hooks being offset relative to each hook of the other series of hooks in a longitudinal direction orthogonal to the main direction. It has been found that the loops or the hooks of the counterpart engage more easily in a maximum number of hooks of the retaining element when two hooks of two directly adjacent series of hooks of the retaining element are not in alignment in the direction in which the counterpart is inserted (i.e. the main direction).

In an example, at least two series of hooks form first and second rows extending in the longitudinal direction.

In the particular circumstance of a plurality of hooks defining more than two series or rows of hooks, each hook of a series of rows is generally offset in the longitudinal direction relative to each hook of all of the other series or rows of hooks carried by the same side wall.

In an example, a field of hooks projecting from a side face of the retaining element presents a hook density over at least a fraction of the surface that it occupies lying in the range 1 hook per square centimeter ($/cm^2$) to 100 hooks/$cm^2$, preferably in the range 5 hooks/$cm^2$ to 50 hooks/$cm^2$, more preferably in the range 10 hooks/$cm^2$ to 30 hooks/$cm^2$. By way of example, this hook density may be the mean density measured over the smallest rectangular area covering all of the hooks in the field of hooks.

Generally, the hook density is constant over the entire extent of the field of hooks.

In order to ensure that it is anchored in the article that overmolds it, the retaining element may include an anchor portion, preferably a perforated anchor portion, that extends substantially orthogonally to the main direction, from at least one its side walls.

In order to improve hooks of the counterpart, each hook may have at least two hooking heads oriented towards the base of the retaining element. It can be understood that the hooking heads project from a common shank. By way of example, they may be superposed in the height direction of the hook.

In order to facilitate unmolding during fabrication of the retaining element, least one hook, and preferably each hook, presents a draft angle in a plane orthogonal to the lateral direction and/or in a plane orthogonal to the main direction.

Generally, in planes orthogonal to the lateral direction and/or in planes orthogonal to the main direction, hooks or hook portions situated beside the top of the retaining element include draft angles of orientation that is inverted relative to the orientation of the draft angles of hooks or hook portions situated beside the bottom of the retaining element.

In the present application, the term "orientation" of a draft angle is used to mean the unmolding direction made possible by the draft angle.

Advantageously, in order to facilitate unmolding of the retaining element, the inside faces of the side walls of said element present surfaces that slope relative to the main direction.

In an example, in a transverse plane of the retaining element passing through at least one hook, the retaining element presents one draft angle above said hook and another draft angle below said hook. Advantageously, the orientation of the draft angle above the hook is inverted relative to the orientation of the draft angle below the hook.

In an example, at least one hook, and preferably each hook, is defined by two opposite cheeks that are substantially plane.

The term "cheek" of a hook is used herein to means a face of the hook that is substantially orthogonal to the longitudinal direction or at least that is oriented generally towards this direction.

In an element, at least one hook, and preferably each hook, is provided with at least one hooking spike projecting from one of its cheeks. The spike may then optionally be oriented towards the base of the retaining element.

The retaining device may further include a pedestal adapted to co-operate with the retaining element so as to cover the hooks of each side wall during molding.

Advantageously, the pedestal has at least one setback adapted to receive the hooks projecting from a side wall of the retaining element once the retaining element is mounted on the pedestal.

In an example, the pedestal has a magnetic portion adapted to co-operate by magnetic attraction with the retaining element and/or the bottom element.

As a variant or in addition, the pedestal may also include a system for holding the retaining element and/or the bottom element that is not magnetic, in particular a system relying on suction, loops, etc.

The present description also provides an assembly of a retaining device as defined above and a counterpart having hooks or loops arranged in the retaining groove in such a manner that the hooks or loops of said counterpart co-operate with the hooks of the retaining element in order to provide a self-gripping fastening.

It can be understood that hooks or loops of the counterpart are retained in reception cavities of hooks of the retaining element.

When the counterpart has loops, the assembly forms a closure of the "touch" fastener type, which may also be referred to as a "contact" closure or a "no pressure" closure.

The present description also provides an assembly comprising an article, in particular a molded article, having a reception groove at its periphery and a retaining device as defined above defining at least a portion of said reception groove.

In an example, the article is molded and the retaining device is overmolded by the molded article.

The present description also relates to such an assembly further including a counterpart with loops or hooks arranged in the retaining groove of the retaining device.

Finally, the present description provides a method of making a hooked retaining device by molding, the method comprising the following steps: providing a mold having at least two mold portions adapted to be assembled together to form a mold cavity in which the hooks of the retaining element are formed; injecting a molding material into the mold, in particular in a single injection step, so that the parting surface of the two molds portions intersect each hook and so that the hook portions formed by any one mold portion do not have any undercut opposing unmolding in the main direction of the retaining device; and separating the two mold portions in the main direction.

In an implementation, the undercuts of a hook relative to a mold portion are situated solely in the portion of the mold cavity that is defined by the other mold portion.

In an implementation, the mold cavity presents an internal projection defining an opening in the base of the retaining element.

In an implementation, a bottom element is positioned between the first and second side walls of the retaining element so as to close said opening.

In an example, the bottom element is fastened to the retaining element by adhesive, welding, mechanical assembly, or clip-fastening.

Advantageously, a molding device suitable for performing the method of the invention may comprise first and second mold portions adapted to be assembled together to form a shape complementary to at least the retaining groove of the retaining element, said first mold portion defining at least a fraction of the first and second side walls of the retaining element and a portion of each hook of the retaining element, and the second mold portion defining at least a fraction of the first and second side walls of the retaining element together with the remaining portion of each hook.

Such a molding device enables the hooks of the retaining element to be unmolded without stress or with limited stresses, and in particular without deforming them. The molding device also makes it possible to obtain hooks in a very wide variety of shapes (hooks having pointed ends, hooks having non-parallel faces, etc.).

BRIEF DESCRIPTION OF THE DRAWINGS

The invention can be well understood and its advantages appear better on reading the following detailed description of several embodiments given as non-limiting examples. The description refers to the accompanying drawings, in which:

FIG. 1 is a perspective view of a retaining device in a first embodiment;

FIG. 2 is a section view on II-II of FIG. 1;

FIG. 2A is a view looking along arrow A showing a detail of FIG. 2;

FIG. 3 is a cross-section view on of the FIG. 1 device;

FIG. 4 is a view projected onto a transverse plane of the FIG. 1 hook;

FIG. 5 shows a pedestal adapted to co-operate with the retaining element of FIGS. 1 to 4;

FIG. 8 shows another example of a pedestal suitable for use in the retaining device of the invention;

FIG. 9 shows the retaining element of FIGS. 1 to 4 after the molded article has been overmolded thereon, and co-operating with a counterpart that is secured to a cover in order to hold said cover on the molded article (in other words in use);

FIG. 10 shows a molded article that is provided, at its periphery, with a reception groove having its bottom defined by a plurality of retaining devices of the invention and co-operating with a counterpart secured to a cover;

FIG. 17 is a cross-section view of a retaining element and of a bottom element of a retaining device in a fifth embodiment of the invention.

DETAILED DESCRIPTION OF EMBODIMENTS

Figure 6:
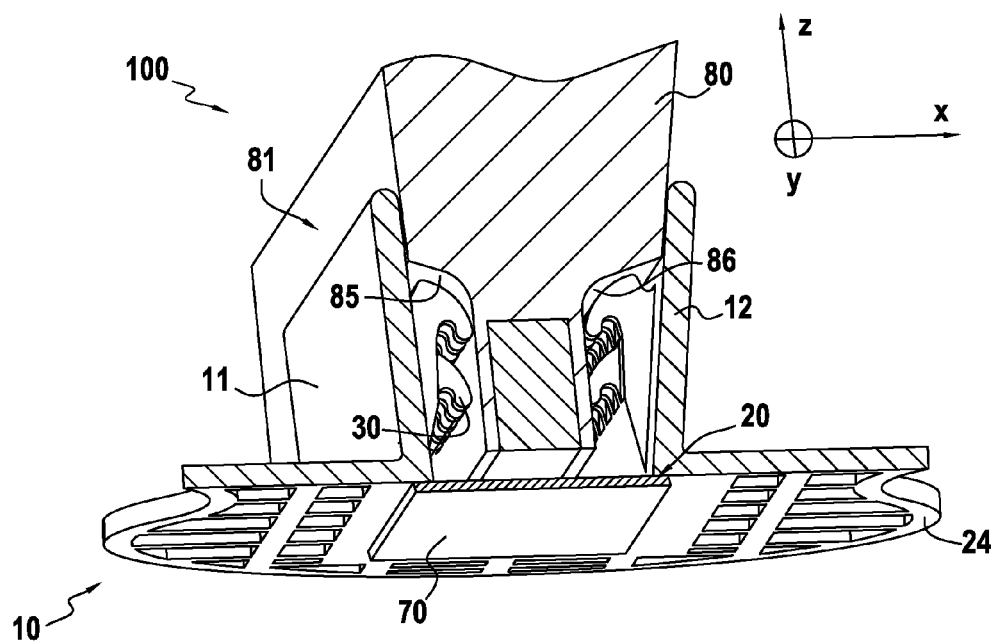
FIG. 6 shows the retaining element mounted on the FIG. 5 pedestal.

A retaining device 100 in a first embodiment is shown in particular in FIG. 1. Such a device is adapted to be placed in a mold used for making an article by molding, the molding material constituting the article possibly being a foam in particular, e.g. a thermoplastic or cured foam. The retaining device is thus overmolded by the article, once it has been molded. Advantageously, it then defines a bottom portion of a reception groove formed at the periphery of the article.

In the embodiment described below, the article having the retaining device 100 fastened thereto is a seat pad for a motor vehicle, which pad is made by molding.

Nevertheless, this example is not limiting. The article to which the retaining device 100 is fastened may be any other article, possibly not even molded, that needs to be associated with a cover. It is also possible to envisage fastening the retaining device of the invention in a manner other than by overmolding, e.g. by adhesive, welding, mechanical assembly, clip-fastening, or any other appropriate fastening technique.

FIG. 10 shows an example of a motor vehicle seat pad 101 constituted by thermoplastic or cured foam made by molding that presents, at its periphery, a reception groove 102 that is formed during molding, and that follows a path comprising both rectilinear and curved portions. The pad 101 is for being covered in a cover 104. In the example shown, the cover 104 is secured to a gusset 103 that has hooks or loops on its outside face. Inside the gusset 103, there extends a shank 105, e.g. in the form of a bar of rigid plastics material, for the purpose of stiffening the assembly.

In this example, a plurality of mutually spaced-apart retaining devices 100 are distributed along the rectilinear portions of the path. In conventional manner, they have the vehicle seat pad overmolded thereon. As described below, each of them is provided with hooks suitable for co-operating with loops or hooks of the gusset 103 in order to hold the cover 104 around the vehicle seat pad 101.

A retaining device 100 in a first embodiment of the invention is shown in greater detail in FIGS. 1 to 4.

The retaining device 100 comprises in particular a retaining element 10 obtained by an injection molding method, in particular using a thermoplastic material, together with a bottom element 70 that is fastened to the retaining element 10.

As shown in FIG. 1, the retaining element 10 has two side walls 11 and 12 that are spaced apart from each other in a lateral direction x, and a base 20 including connection means connecting together the two side walls 11 and 12.

The retaining element 10 forms an elongate element defining a front end 10a and a rear end 10b in a longitudinal direction y.

In a transverse plane P1 of the retaining element 10 that is orthogonal to the longitudinal direction y, the side walls 11 and 12 and the base 20 define a retaining groove 14 of a generally U-shaped profile that is open in a main direction z of the retaining device 100 for the purpose of receiving a counterpart 103 with hooks or loops that is secured to the cover 104 (FIG. 9).

Below, a "bottom" side and a "top" side of the retaining device 100 are defined relative to this main direction z, the base 20 being situated at the bottom side and the longitudinal free edges 11c and 12c of the side walls 11 and 12 at the top side.

In the particular example shown, the side walls 11 and 12 extend on either side of a plane of symmetry P2 of the retaining element 10. As shown in FIG. 1, the lateral direction x is orthogonal to the plane of symmetry P2. The above-defined main and longitudinal directions z and y are parallel to the plane of symmetry P2.

In the example shown, the means for connecting together the side walls 11 and 12 comprise two connection strips, respectively a front strip 21 and a rear strip 22 extending in the lateral direction x, which strips are substantially plane and orthogonal to said side walls 11 and 12. Each connection strip 21, 22 connects a (front or rear) longitudinal end of the first side wall 11 to the corresponding (front or rear) longitudinal end of the second side wall 12.

In the example, the connection means between the first and second side walls 11 and 12 further include a perforated anchor portion 24 extending outside the side walls 11 and 12 and the connection strips 21 and 22. The anchor portion 24 extends orthogonally to the main direction z. It can be understood that once the vehicle seat pad 101 has been overmolded on the retaining device 100, the side walls 11 and 12 of the retaining element 10 run along the side walls of the reception groove 102. The anchor portion 24 is embedded in the molding material, thereby providing non-releasable fastening of the retaining element 10 to the pad 101.

It should be observed that in various embodiments, the retaining element 10 may be anchored in the molded article 101 by other connection means, e.g. by adhesive, by welding, or indeed by the fact that while performing the method of foaming the article 101 the foam can adhere to the material constituting the side walls 11 and 12 and/or the anchor portion 24, which material may be acrylonitrile butadiene styrene (ABS).

As shown in FIG. 1, the base 20 has an opening 23 defined by the side walls 11 and 12 and by the connection strips 21 and 22. It can be seen from the description below that this opening 23, which results from the method of fabricating the retaining element 10, may be filled in or covered by the bottom element 70.

In order to fasten the cover 104 to the retaining device 100, the retaining element 10 is provided with a plurality of hooks 30 that, in this example, project from the inside face of each side wall 11, 12. Each hook 30 is adapted to co-operate with a counterpart, in this example the gusset 103 having hooks or loops, which counterpart is inserted in the retaining groove 14, as shown in FIG. 9 or FIG. 10.

In this example, all of the hooks 30 are of generally similar shape. Nevertheless, it is possible to envisage that the hooks in a single retaining device present shapes that are different, e.g. such as those shown in FIGS. 12 to 16.

As shown in FIG. 2, a hook 30 is defined by first and second cheeks 30a and 30b that are substantially orthogonal to the longitudinal direction y of the device 100. The two cheeks 30a and 30b are connected together by an intermediate surface 30c forming the edge face of the hook 30. In this example, the intermediate surface 30c is a portion of a cylindrical surface having a generator line that extends in the longitudinal direction y. In this example, the hooks 30 present symmetry about a midplane P3 that is orthogonal to the longitudinal direction y.

As shown in FIG. 4, each hook 30 comprises a shank 34 projecting from the side wall 11, 12 of the retaining element 10 and extending in a main direction or height direction that is substantially orthogonal to the side wall 11, 12 of the retaining element 10 (and thus substantially parallel to the lateral direction of the retaining element), and a hooking portion 33, in this example a hooking head, that extends laterally relative to said main direction of the shank 34, from said shank 34.

The axis x1 of a hook 30 is generally defined as an axis parallel to the lateral direction x of the retaining element 10 and passing through the middle of the base of the hook 30.

FIG. 4 shows a hook 30 in a transverse projection plane, i.e. in a plane orthogonal to the longitudinal direction y of the retaining element.

In such a plane, it is possible to define a limit line DL of the hooking head 33, which line is a line parallel to the lateral direction x, and starting from the axis x1 of the hook 30 and going towards the base 20, it is the first line to intersect the envelope curve of the hook 30 at two points. The hook portion on the side of this line DL that is closer to the base 20 of the retaining element and that is further from the lateral wall 11 constitutes the hooking head 33.

As shown in FIGS. 3 and 4 in particular, each hooking head 33 in this example points towards the base 20 of the retaining element 10. It can be understood that the distal end of each hook 30 faces towards the opening 23 of the base 20 or towards the bottom element 70, if there is one. In other words, the hooking head 33 of each hook 30 extends from its shank 34 towards the bottom of the retaining groove 14.

Each hook 30 thus defines a retention cavity (or reception cavity) 36 that is open towards the base 20 of the retaining element 10 and that is adapted to receive a hook or a loop of the counterpart 103.

Once engaged in the retention cavity 36, the hook or the hook of the counterpart 103 is retained in the main direction z, and also in the lateral direction x of the retaining element 10.

In the projection plane of FIG. 4, the width of the retention cavity 36, written x36, is measured in the lateral direction x of the retaining device 10 between the low point PB of the hook that corresponds in this example to the tip of the hooking head 33 closest to the base 20 in the main direction z, and the opposite portion of the retaining element 10 that is closest in this example to the side wall 11.

The depth of the retention cavity 36 is written z36. It is measured along the main direction z of the retaining device 10 between the above-mentioned low point PB of the hook 30 and the high point PH of the bottom face of the hook 30 that faces towards the base 20 (in other words the point of this base that is farthest from the base 20 in the main direction z, and that is arranged between the side wall and the low point PB).

In FIG. 4, there can also be seen in the above-mentioned projection plane the neutral axis F of a hook 30 and the salient angle b formed between a first vector that is tangential to the neutral axis of a hook at the point where said neutral axis F intersects the surface of the hook 30 and oriented away from said hook, and a sector vector parallel to the main direction of the retaining device and oriented from the inlet towards the bottom of the retaining groove. This angle b is strictly less than 90°, preferably lying in the range 5° to 65°, and in this example is equal to about 30°.

The width and length dimensions of each hook 30, and the dimensions of its retention cavity 36, determine proper retention of the counterpart 103.

The maximum width of a hook, written y30 in FIG. 2A, is measured in the longitudinal direction y of the retaining device 10 in the hooking portion 33 of the hook in a projection plane of the hook 30 orthogonal to the main direction z of the retaining device.

The maximum width of a hook, written x30, is measured in the lateral direction x of the retaining device 10, going from the side wall 11 from which the hook 30 projects.

The ratio x30/y30 is preferably greater than or equal to ⅓, and more preferably greater than or equal to 1.

In the example shown (see FIG. 2 in particular), the hooks 30 are arranged on each side wall 11, 12 in rows 31 and 32, extending in the longitudinal direction y, there being two such rows in this example.

The spacing e of two hooks 30 in a given row (i.e. the space between the respective midplanes P3 of two adjacent hooks) is constant and identical for both rows 31 and 32.

The two rows 31 and 32 of the hooks 30 are offset in the longitudinal direction y by a distance e/2, such that each hook 30 of a row 31 is offset relative to each hook 30 of the other row 32 in the longitudinal direction y. Two hooks of two adjacent rows therefore do not overlap in the main direction z.

Nevertheless, the particular arrangement described above is not limiting, as can be seen from other examples that are shown in the present application.

While molding the vehicle seat pad, it is essential to avoid the hooks 30 being damaged or contaminated by the molding material.

In this example, the bottom element 70 contributes to this result by preventing the molding material from penetrating via the opening 23 of the retaining element 10. In this example it is distinct from the retaining element 10 and is fitted thereon to close the opening 23 in the base 20.

The bottom element 70 may be fastened to the retaining element 10 by adhesive, welding, mechanical assembly, clip-fastening, or any other appropriate fastening technique. It may be made of a material that is identical to or different from the material constituting the retaining element 10.

In a fifth embodiment shown in FIG. 17, the bottom element 70 may also be made integrally with the retaining element 10' while molding said element 10'. Under such circumstances, the bottom element 70 is a foldable portion, generally secured to the base 20 and adapted to be folded between an initial position in which it does not close the opening 23 in the base 20 and a position in which it covers the opening 23.

In order to protect the hooks while molding the vehicle seat pad, thereby preserving their gripping properties, the retaining device may also include a pedestal 80 of the type shown in FIG. 5.

The pedestal 80 is adapted to co-operate with the retaining element 10 and possibly with the bottom element 70 during molding of the pad 101. As shown in FIG. 5, the pedestal 80 presents the form of a low wall having its top 83 pointing towards the base 20 of the retaining element 10 when the retaining device 100 is in its mounted position.

In order to enable the pedestal 80 to co-operate with the retaining element 10, as shown in FIG. 1, the retaining element 10 includes a hook-free bearing zone 40 in the vicinity of its periphery.

In the example shown, the bearing zone 30 of the retaining element 10 has a first central bearing zone 41 running along the top longitudinal edge 11c of the first side wall 11 and a second central bearing zone 42 running along the top longitudinal edge 12c of the second side wall 12 (FIG. 3).

In the particular example shown, the bearing zone 40 also has a front bearing zone 40a extending at its front end 10a, substantially from the top edge 11c of the first side wall 11 to the top edge 12c of the second side wall 12 of the retaining element 10, passing via the connection strip 21.

In the same manner, the bearing zone 40 has a rear bearing zone 40b extending at its rear end 10b substantially from the top edge 11c of the first side wall 11 to the top edge 12c of the second side wall 12 of the retaining element 10, passing via the connection strip 22.

In the particular element shown, the front and rear bearing zones 40a and 40b and the central bearing zones 41 and 42 form a closed outline surrounding all of the hooks 30 of the retaining element 10.

Figure 7:
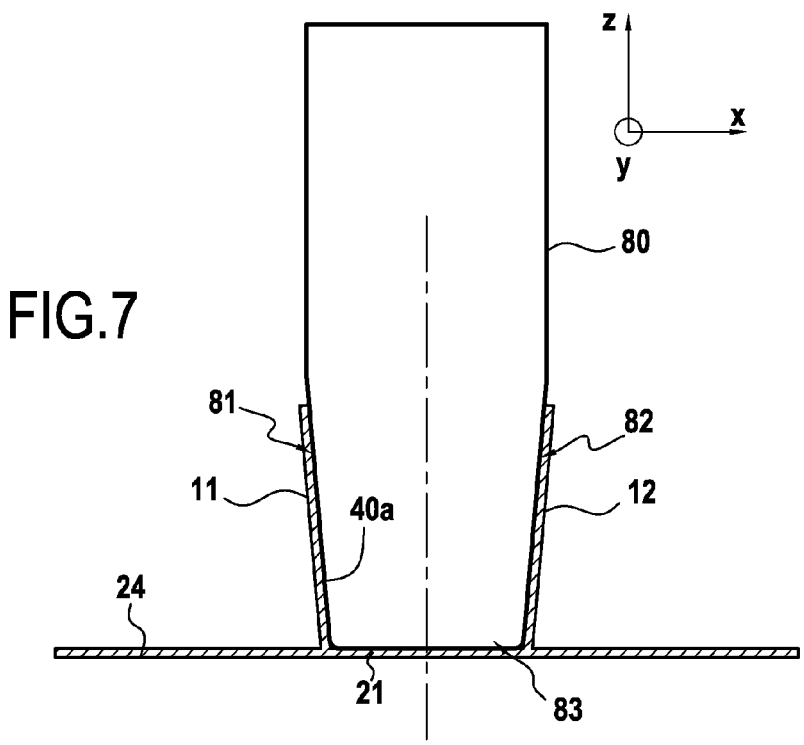
FIG. 7 is a face view showing the bearing zones between the retaining element and the pedestal in order to seal the retaining groove.

As shown in FIG. 7, the pedestal 80 is of a shape complementary to a portion of the side walls 11 and 12 and of the connection strips 21 and 22 of the retaining element.

More precisely, and as mentioned above, the pedestal 80 is adapted to co-operate by its complementary shape with the bearing zone 40 of the retaining element 10.

In the assembled position, the side faces 81 and 82 of the pedestal 80 are in contact with the side walls 11 and 12, and in particular with the first and second central bearing zones 41 and 42 and also with a portion of the front and rear bearing zones 40a and 40b at the ends of the retaining element 10.

The top 83 of the pedestal comes to bear against the connection strips 21 and 22.

In another embodiment, the distance between the central bearing zones 41 and 42 of the retaining element 10 is slightly less than the distance between the side faces 81 and 82 of the pedestal 80, said distances being measured at rest (i.e. in the non-assembled position) and in the lateral direction x. The side walls 11 and 12 are then adapted to flex elastically apart from each other so as to be capable of receiving between them the pedestal 80 and ensure continuous contact between the pedestal 80 and each of the side walls 11 and 12 over at least the entire length of the retaining element 10 that is occupied by the hooks 30, and preferably over substantially the entire length of the retaining element 10.

As shown in FIGS. 5 and 6, the pedestal 80 has a central zone or insertion zones 84 where each side face 81 and 82 presents a setback 85 or 86 for receiving the hooks 30 of the retaining element 10 in the assembled position. Because of these provisions, the hooks 30 are not clamped between the side wall of the retaining element 10 and the side face of the pedestal 80, and they are not damaged.

Advantageously, one of the pedestal 80 and the bottom element 70 includes a magnetized portion, while the other of the pedestal 80 and the bottom element 70 includes a portion that is magnetic or not magnetized. In this way, by attracting each other, the pedestal 80 and the bottom element 70 are held in a position that guarantees that the retaining groove 14 is sealed from the outside while the article 101 is being molded.

In the example shown, the bottom element 70 is made of stainless steel and in the vicinity of its top 83, the pedestal 80 has a magnetized portion 88.

When a plurality of retaining elements are overmolded by a single article in order to be fitted in a common reception groove of said article, it is possible to provide a long continuous pedestal 80 having a plurality of insertion zones 84 as defined above, each suitable for co-operating with a respective retaining element 10.

As mentioned above, the retaining element 10 of the invention is made by an injection-molding method, in particular molding a thermoplastic material.

A molding device 50 suitable for use in fabricating it, and the corresponding method of fabrication are described below with reference to FIGS. 11A and 11B.

Figure 11A:
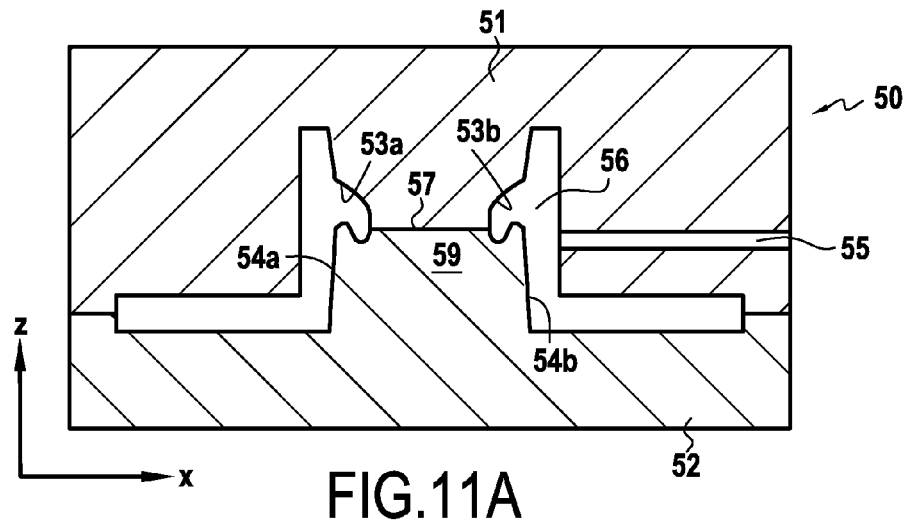
FIGS. 11A and 11B show a molding device for fabricating a retaining element of the invention by injection molding, the device being shown respectively in a closed position and in an open position.

The molding device 50 shown in FIG. 11A comprises a first mold portion or top shell 51 and a second mold portion or bottom shell 52, at least one of which is movable, the mold portions being adapted to be assembled together to constitute a mold.

The top and bottom shells 51 and 52 are shaped so that their inside walls, once assembled together, define a mold cavity 56, in this example having the shape of the retaining element 10. In the assembled position of the mold portions 51 and 52, and as shown in FIG. 11A, their parting surface 57 intersects each hook 30 of the retaining element such that the hook portions 30 formed by a given mold portion 51, 52 do not have any undercut opposing unmolding in the main direction z.

The top shell 51 thus includes surfaces 53a and 53b that are complementary to the top portions of the first and second side walls 11 and 12 situated above the hooks 30, and to a top portion of each hook 30.

In similar manner, the bottom shell 52 inside the mold cavity 56 forms a projection 59 having surfaces 54a and 54a complementary to the bottom portions of the first and second side walls 11 and 12 situated under the hooks 30, and to a bottom portion of each hook 30.

In order to mold the retaining element 10, the top and bottom shells 51 and 52 are assembled together to form the mold 50.

A molding material, generally a thermoplastic material, is injected through at least one injection hole 55 provided in one or the other of the shells 51 and 52 constituting the mold so as to fill the inside space 56 of the mold 50.

The shells 51 and 52 are held in the assembled position until the molding material has hardened. Thereafter they are moved apart from each other in a direction corresponding to the main direction z of the retaining element 10, thereby releasing the retaining element 10.

It can thus be understood that the opening 23 formed in the base 20 of the retaining element 10 is defined by the projection 59 of the bottom shell 52.

Figure 11B:
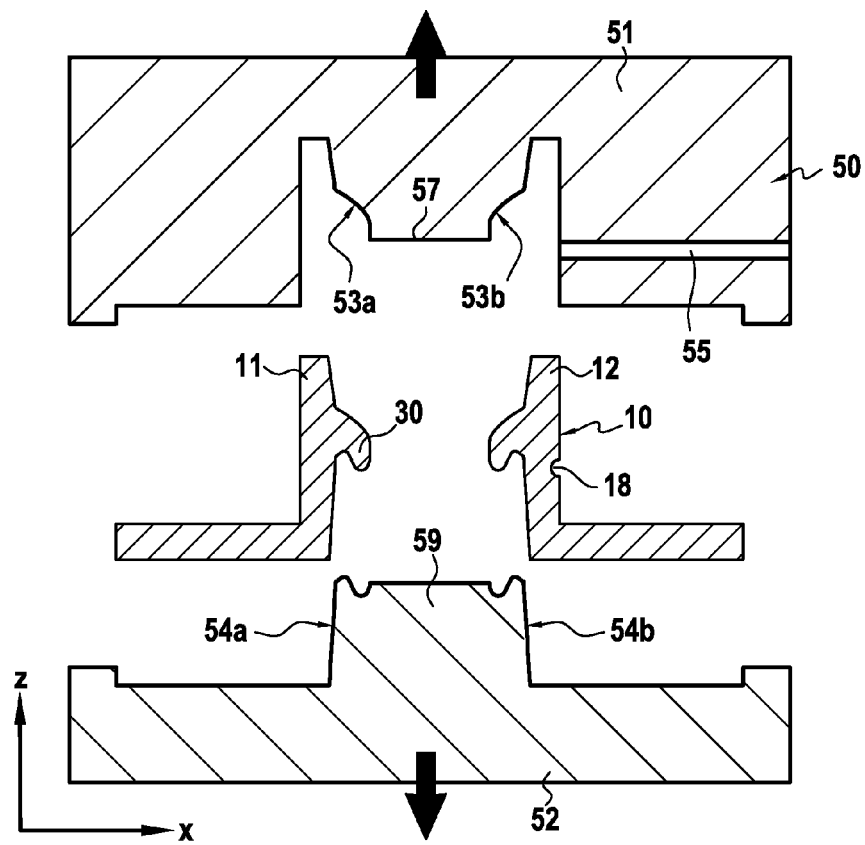

As shown in FIG. 11B, the retaining element 10, includes a zone 18 of recessed shape in its outside surface corresponding to the point where the molding material was injected. This zone may also be in the form of a bulge.

Such a method of molding each hook 30 in at least two portions enables hooks 30 to be formed that are oriented towards the base 20 of the retaining element 10 while considerably limiting stresses during unmolding. It also makes it possible to widen the potential shapes for the hooks 30 considerably.

The retaining element 10 obtained by the above-described molding method has draft angles that are described below resulting from the shape of the shells 51 and 52.

As shown in FIG. 3, the inside faces of the side walls 11 and 12 of the retaining element 10 present surfaces that slope relative to the main direction z with respective angles θ above the hooks 30 and β below the hooks 30, where θ and β are about 5°, with the orientation of the draft angle of the top portion being opposite to that of the bottom portion.

Each hook 30, 30' also has respective draft angles of different orientations in its top and bottom portions.

As shown in FIGS. 2 and 2A, the orientation of the draft angle of the hooks can reverse at different locations of the hook.

In the example described, each hook 30 of the top row 31 is thus split into two portions, a top portion and a bottom portion presenting draft angles with opposite orientations. Over a top portion formed by the top shell 51, and in a plane orthogonal to the lateral direction x, the hook has a draft angle such that the distance between the cheeks 30a and 30b, as measured in the longitudinal direction y, decreases progressively going towards the top of the retaining element 10.

In a bottom portion formed by the bottom shell 52 and including the head of the hook (i.e. its distal end), the draft angle of the hook 30 is inverted: the spacing between the cheeks 30a and 30b decreases progressively towards the bottom of the retaining element 10.

As can be seen in FIG. 2A, the hook 30 also presents a draft angle in a plane orthogonal to the main direction z.

A hook 30' of the bottom row 32 presents a draft angle in a plane orthogonal to the lateral direction x such that the distance between its cheeks 30a' and 30b' as measured in the longitudinal direction y decreases progressively going towards the bottom of the retaining element 10, over the entire height of the hook 30'. In a plane orthogonal to the main direction z, the hook 30' presents a draft angle such that the distance between the cheeks 30a and 30b as measured in the lateral direction x decreases progressively on going away from the side wall 11 of the retaining element 10 from which the hook 30' projects.

Alternative hook shapes suitable for use in a retaining device 100 of the present description are shown in FIGS. 12 to 16.

Elements that are identical or similar to those described above are referenced in the description below and in the corresponding figures by the same respective numerical references plus 100, 200, or 300.

Figure 12:
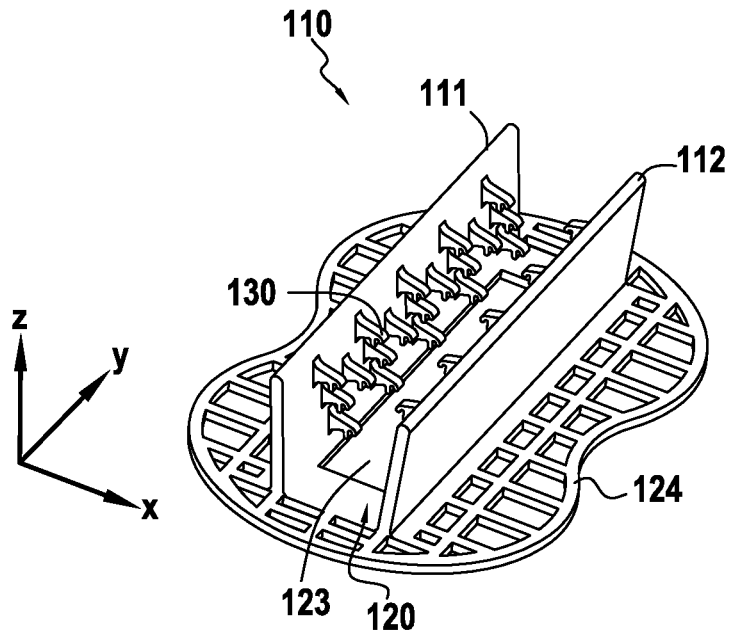
FIGS. 12 and 13 show a retaining element in a second embodiment.
Figure 13:
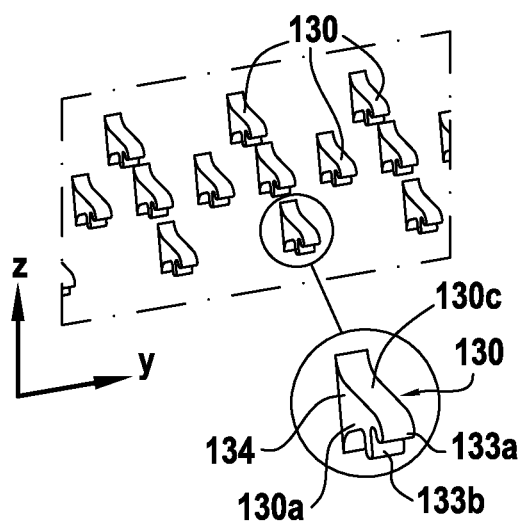

In FIG. 12, there is shown by way of example a retaining element 110 having hooks 130, each having two hooking heads 133a and 133b that are superposed in the height direction of the hook 130, both of which are oriented towards the base 120 of the retaining element 110. In this particular example, it should be observed that the neutral axis f of the hook 130 that is used for defining the general orientation of the hook 130 needs to be considered for each hooking head.

In the example shown, the hooking head 133a farther from the side wall 111 from which the hook 130 projects is shorter than the second hooking head 133b so as to hook onto loops of the counterpart at different levels along the main axis z.

Figure 14:
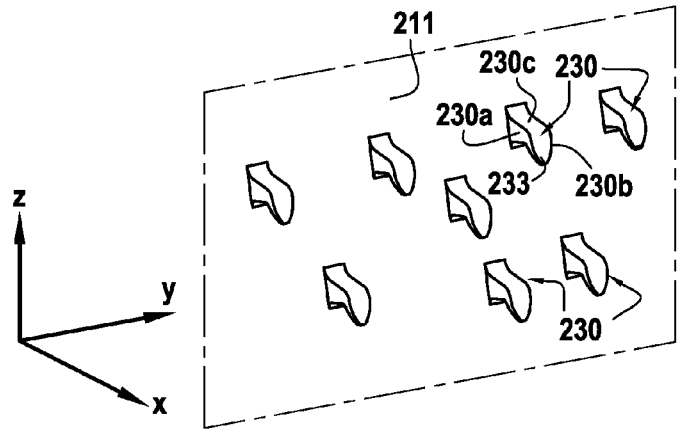
FIG. 14 shows a third embodiment.

FIG. 14 shows hooks 230 each presenting respective hooking heads 233 that narrow progressively towards their free ends, which are substantially pointed in shape.

In the example shown, the distance between the first and second cheeks 230a and 230b of the hooks 230 decreases progressively to become zero or almost zero at the distal end of the hook 230.

Figure 15:
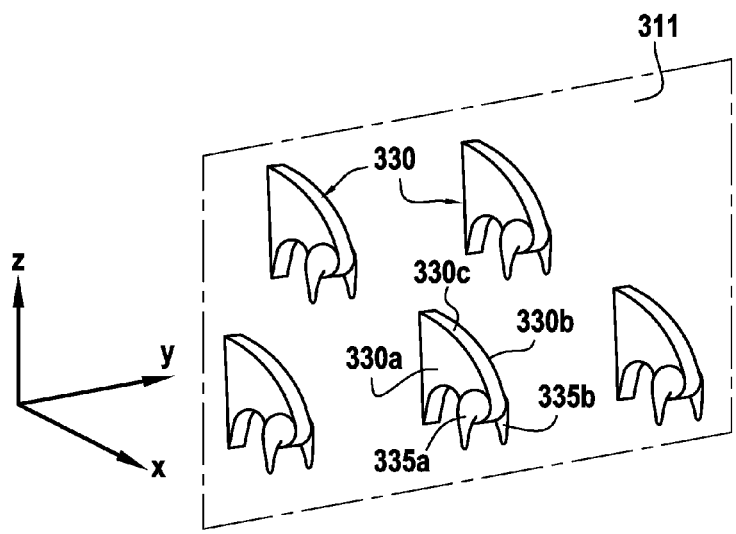
FIG. 15 shows a fourth embodiment.

FIG. 15 shows yet another example of a hook 330, having hooking spikes 335a and 335b projecting from each of the cheeks 330a and 330b like "horns". These spikes 335a and 335b have pointed distal ends that, in this example, point towards the base of the retaining element.

In a variant, a hook could have only one spike projecting from only one of its cheeks.

Figure 16:
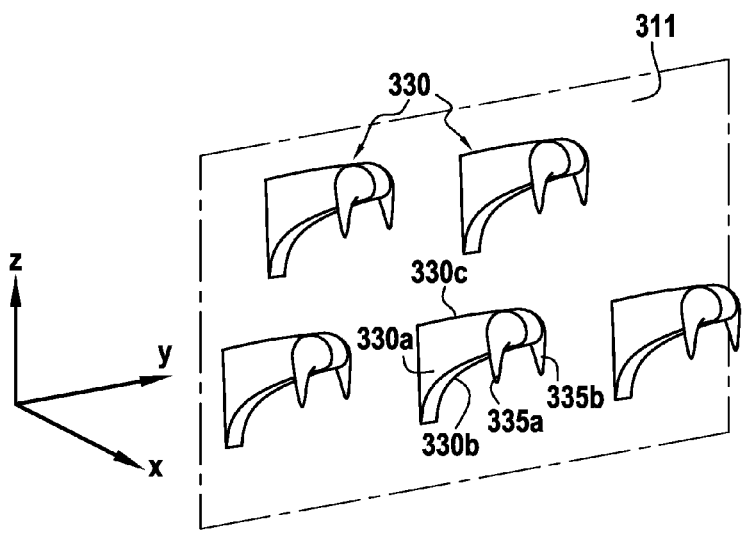
FIG. 16 shows a variant of the fourth embodiment.

In another embodiment shown in FIG. 16, the hooking portion of the hook may be formed exclusively by one or more hooking spikes 335a, 335b of the type described with reference to FIG. 15, projecting from the central portion of the hook, and oriented towards the base of the retaining element. The central portion of the hook may then be oriented in the lateral direction or towards the opening of the retaining groove, as shown in the example.

The invention claimed is:

1. A hooked retaining device for defining at least a portion of a reception groove formed at the periphery of an article, the retaining device comprising a retaining element made by injection molding, the retaining element having a first side wall and a second side wall that are spaced apart from each other in a lateral direction, and a base connecting together said side walls, said side walls and the base defining a retaining groove that is open in a main direction in order to receive a counterpart having hooks or loops, said retaining device being characterized in that at least one of the side walls presents a plurality of hooks adapted to co-operate with the counterpart, each hook having at least one hooking portion oriented towards the base of the retaining element, and wherein at least one hook of the plurality of hooks presents a taper in a plane orthogonal to the lateral direction with a first width at the junction between the hook and the base and a second width at a free end of the hook that is strictly smaller than the first width to form a draft angle.

2. A retaining device according to claim 1, wherein the base presents at least one opening between the first and second side walls.

3. A retaining device according to claim 2, further including at least one bottom element configured to be positioned between the first and second side walls in order to close the opening.

4. A retaining device according to claim 3, wherein the bottom element is an element that is distinct from the retaining element and fastened on said retaining element in order to close the opening.

5. A retaining device according to claim 3, wherein the bottom element is made integrally with the retaining element and constitutes a portion that can be folded between a disengaged position in which the opening in the base is disengaged and a closed position in which it closes the opening.

6. A retaining device according to claim 3, wherein the bottom element is made of a material that is different from the material of the side walls.

7. A retaining device according to claim 3, wherein the bottom element comprises a magnetic material.

8. A retaining device according to claim 1, wherein the retaining element comprises a magnetic material.

9. A retaining device according to claim 1, wherein the plurality of hooks defines at least two series of hooks that are spaced apart in the main direction, each hook of one series of hooks being offset relative to each hook of the other series of hooks in a longitudinal direction orthogonal to the main direction.

10. A retaining device according to claim 9, wherein at least two series of hooks form first and second rows extending in the longitudinal direction.

11. A retaining device according to claim 1, wherein each hook has at least two hooking heads oriented towards the base of the retaining element.

12. A retaining device according to claim 1, wherein each hook presents the taper in a plane orthogonal to the lateral direction to form the draft angle.

13. A retaining device according to claim 1, wherein at least one hook presents a second taper in a plane orthogonal to the main direction.

14. A retaining device according to claim 1, wherein the inside faces of the side walls of the retaining element present surfaces that are inclined relative to the main direction.

15. A retaining device according to claim 1, wherein at least one hook is provided with at least one hooking spike projecting from one of its cheeks.

16. A retaining device according to claim 1, further including a pedestal adapted to co-operate with the retaining element so as to cover the hooks of each side wall during molding.

17. A retaining device according to claim 16, wherein the pedestal has a magnetic portion adapted to co-operate by magnetic attraction with the retaining element and/or a bottom element.

18. An assembly comprising a retaining device according to claim 1, and a counterpart having hooks or loops arranged in the retaining groove in such a manner that the hooks or loops of said counterpart co-operate with the hooks of the retaining element in order to provide a self-gripping fastening.

19. An assembly comprising an article having a reception groove, and a retaining device according to claim 1 defining at least a portion of said reception groove.

20. An assembly according to claim 19, wherein the article is molded and the retaining device is overmolded by the molded article.

* * * * *